United States Patent [19]

Graner et al.

[11] Patent Number: 5,428,331
[45] Date of Patent: Jun. 27, 1995

[54] COMPONENT SUBSTRATE AND METHOD FOR HOLDING A COMPONENT MADE OF FERROMAGNETIC MATERIAL

[75] Inventors: Juergen Graner, Sersheim; Norbert Keim, Bietigheim; Martin Maier, Moeglingen; Manfred Nitsch, Schwieberdingen; Josef Weber, Heimerdingen, all of Germany

[73] Assignee: Robert Bosch GmbH, Stuttgart, Germany

[21] Appl. No.: 978,006

[22] Filed: Nov. 18, 1992

[30] Foreign Application Priority Data

Nov. 28, 1991 [DE] Germany ............... 41 39 106.3
Aug. 22, 1992 [DE] Germany ............... 42 27 848.1

[51] Int. Cl.⁶ ............... H01F 7/20; C25B 1/00; B05C 13/00
[52] U.S. Cl. ............... 335/285; 205/119; 204/DIG. 5; 204/97; 118/500; 29/DIG. 12; 335/289
[58] Field of Search ............... 335/284, 285, 286, 287, 335/288, 289; 205/90, 119; 51/362; 269/8; 279/128; 206/818; 224/183; 24/303; 81/125; 292/251.5; 7/901; 204/297 M, DIG. 5; 118/500, 503; 29/DIG. 12

[56] References Cited

U.S. PATENT DOCUMENTS

| 1,603,497 | 10/1926 | Simmons | 335/285 |
| 2,104,472 | 1/1938 | St. Clair | 335/285 |
| 2,812,203 | 11/1957 | Scholten | 335/285 |
| 3,095,525 | 6/1963 | Hansen | 24/303 |
| 3,336,551 | 8/1967 | Stead | 335/295 |
| 3,419,832 | 12/1968 | Baermann | 335/285 |
| 3,439,416 | 4/1969 | Yando | 29/625 |
| 3,641,284 | 2/1972 | Westerkamp | 179/100.41 K |
| 3,827,021 | 7/1974 | Phelon | 335/285 |
| 4,198,283 | 4/1980 | Class | 204/298 |
| 4,250,478 | 2/1981 | Cardone | 354/288 |
| 4,253,489 | 3/1981 | Schleiter | 137/527 |
| 4,399,482 | 8/1983 | Inoue | 361/145 |
| 4,591,817 | 5/1986 | Miller | 335/285 |
| 4,802,580 | 2/1989 | Andersen | 206/378 |

FOREIGN PATENT DOCUMENTS

| 0206107 | 12/1983 | Japan | 335/289 |
| 424246 | 11/1933 | United Kingdom | 204/297 M |

Primary Examiner—Leo P. Picard
Assistant Examiner—Stephen T. Ryan
Attorney, Agent, or Firm—Edwin E. Greigg; Ronald E. Greigg

[57] ABSTRACT

This invention is for holding components made of a ferromagnetic material parallel to a component axis for electroplating the component. The component substrate according to the invention has at least two magnet poles, oriented toward the components and having opposite polarity. The magnet field lines extend from one magnet pole to the other magnet pole through the components only in the vicinity of a contact faces of the components oriented toward the magnet poles. This prevents ferromagnetic particles from depositing on the ends of the components remote from the contact faces. The apparatus according to the invention is especially suitable for holding a plurality of components during electrolytic surface coating of the components.

28 Claims, 6 Drawing Sheets

COMPONENT SUBSTRATE AND METHOD FOR HOLDING A COMPONENT MADE OF FERROMAGNETIC MATERIAL

BACKGROUND OF THE INVENTION

The invention is based on a component substrate for holding a component made of a ferromagnetic material, and on a method for holding a component made of a ferromagnetic material, as defined hereinafter. It has already been proposed that a component made of a ferromagnetic material be held on a contact face by means of a single magnet pole whose field lines extend through the component parallel to an axis of the component. If a component held in this way is meant to be coated on its end remote from its contact face, for instance by being dipped partway into an electroplating bath, then the danger is that ferromagnetic particles will be deposited on the region of the component to be coated. These loose ferromagnetic particles are attracted by the field lines emerging from the component in the region to be coated and become deposited on the surface. When the component is coated, these particles form beads that lend a poor quality on its surface in the coated region and accordingly prevent the resultant component from being used.

OBJECT AND SUMMARY OF THE INVENTION

The component substrate as defined herein and the method of the invention as defined hereinafter have the advantage over the prior art that in the component to be held, the field lines of the magnetic field generated by the at least two magnet poles extend in concentrated form only in the vicinity of the contact face of the component opposite the magnet poles and do not emerge from the component, or do so to only a limited extent, in the region of the component that is to be coated. Because there is now only a slight proportion of field lines in the component region to be coated, loose ferromagnetic particles cannot stick to the surface of the component there and accumulate. An electroplated layer without inclusions or beads can be deposited on the surface of the component that is to be coated.

For an especially simple embodiment of the component substrate, it is advantageous if the component substrate has precisely two magnet poles of opposite polarity, oriented toward the contact face of the at least one component.

For the same reason, it is also advantageous if the component substrate has precisely two magnet poles oriented toward the contact face of the at least one component, and that two pole pieces remote from the component, between which a dipole magnet is provided, serve to form the two magnet poles.

It is also advantageous if the component substrate has precisely three magnet poles, oriented toward the contact face of the at least one component, and if each two adjacent magnet poles have opposite polarity, so that the magnet field lines extending through the component in the vicinity of the contact face are especially short.

To prevent a magnetic short circuit between two adjacent magnet poles having opposite polarity, it is advantageous if a neutral zone is provided between two adjacent magnet poles.

It is advantageous if a magnetic air gap is provided between the contact face of each component and the at least two magnet poles. Contact rails to provide electrical contact for the component to be electroplated may be provided in the air gap, along with a protective layer for the at least one magnet disposed in the component substrate.

If it is a goal to have time-limited phases of the action of adhesive forces, originating in magnets, between contact rails and components, then it is an advantage to use electromagnets, instead of permanent magnets. The selection of the current through a current coil of the electromagnet makes it possible to vary the adhesive force and adapt the adhesive force to the component sizes. Switching off the current also lowers the adhesive force or causes it to disappear entirely, making time-saving and simplified component placement and removal on the component substrate possible. Using a magnetizable pole core and magnetizing it by means of at least one current pulse supplied to the current coil has the advantage of not having to keep the power supply in operation over the entire processing time.

It is especially advantageous to embody a contact strip, serving as a substrate strip for the contact rails and connected to the cathode of the electroplating bath, as an independent structural element. A material that has good electrical conductivity and is diamagnetic, such as aluminum, is used as the material for the contact strip. In embodiments of the invention in which the contact strip and contact rails are produced as a structural element and thus are made of the same material, adhesion forces between the contact rails and the components are reduced, and depending on the component sizes, such forces may be adequate. On the other hand, if the adhesive forces are overly low, the thickness of the layers to be made on the components by an electroplating bath may fluctuate as a consequence of varying contact resistances.

It is therefore advantageous, if strong forces of adhesion are needed, to fabricate the contact rails from a ferromagnetic material and secure them electrically conductively to the contact strip. The electrical contacting of the contact rails need not be done via the contact strip; instead, the contact rails can be joined directly to the current circuit of the electroplating bath, in other words without the interposition of the contact strip. Moreover, by using contact rails of ferromagnetic material, the advantage is attained that the effective magnetic air gap between the magnet poles and the contact face of each component is reduced by the amount of the height of the contact rails. The magnetic resistance of the ferromagnetic material of the contact rails is in fact negligibly low, compared with the magnetic resistance of the contact strip.

Using a system of contact rails with a connecting web that is made in one piece has further advantages. It simplifies the manufacture of the one-piece contact rail system considerably. The connecting web between the contact rails does cause a magnetic short circuit, however. It is therefore advantageous to make the contact rails of an alloy having a substantially lesser saturation induction than that of pure iron; one example is a nickel-iron alloy. The magnetic flux flowing via the connecting web is thus markedly reduced, compared with the magnetic flux flowing across the magnetic short circuit in the case of iron. Another advantage of a nickel-iron alloy is due to its favorable chemical and electrochemical resistance in the atmosphere and in electroplating and chemical processing baths. The magnetic short circuit is also lessened by reducing the height of the connecting web. The web height is limited by a minimum dimension necessary for production reasons.

The invention will be better understood and further objects and advantages thereof will become more apparent from the ensuing detailed description of preferred embodiments taken in conjunction with the drawings.

DESCRIPTION OF THE PREFERRED EMBODIMENTS

FIGS. 1-9 show nine exemplary embodiments of a component substrate 1 according to the invention for holding at least one component 3, made of a ferromagnetic material; by way of example, the substrate serves to hold components 3 in the course of at least partial coating of the components 3 in electroplating baths. Elements that are the same and function the same are identified by the same reference numerals. The component substrate 1, made of a nonferromagnetic material such as copper, aluminum or plastic, is elongated in shape, for example, so as to hold a plurality of components 3 spaced apart from one another; the components are disposed one after the other along a longitudinal axis of the component substrate 1 extending at right angles to the plane of the drawing. A recess 7 extending longitudinally of the component substrate and serving to receive at least one magnet 8 is formed in the component substrate 1, beginning at an upper face end 5. A permanent magnet or an electromagnet may be used as the magnet 8. A cup-shaped covering 9 fits around the component substrate 1, extending longitudinally of it. The covering 9 has a first side part 11 and a second side part 13, which extend at right angles to the upper face end 5 of the component substrate 1 and rest on its outer walls, for example. The covering 9 has a cap part 15 that joins the two side parts 11, 13 together, remote from the component substrate 1; by way of example, the cap part 15 extends parallel to the upper face end 5 of the component substrate 1 and is spaced apart from the upper face end 5 by a predetermined distance. A number of through openings 17, corresponding to a number of components 3 to be held by the component substrate 1, is formed in the cap part 15 of the covering 9.

A contact strip 21 extending longitudinally of the component substrate 1 is disposed on its upper face end 5; it serves to provide electrical contact of the components 3 to be coated and is connected to the cathode of the electroplating bath. To that end, the contact strip 21 has contact rails 23, for instance two of them, extending longitudinally of the component substrate 1 and protruding opposite the encompassing regions of the contact strip 21, remote from the upper face end 5 of the component substrate 1.

It is equally possible for contact rails 23A (FIG. 8), extending longitudinally of the component substrate 1, to be embodied as separate, individual structural elements that are independent of the contact strip 21. The contact rails 23A, made from ferromagnetic material, are placed on a side 37 of the contact strip 21 remote from the at least one magnet 8. Two contact rails 23B (FIG. 9) may also be embodied in one piece and as a ferromagnetic structural element that is independent of the contact strip 21, having a connecting web 46 that precisely determines the distance between the two contact rails 23B. The structural element formed of the contact rails 23B and the connecting web 46 is likewise located on the side 37 of the contact strip 21, remote from the at least one magnet 8, in such a way that each of the components 3, which for instance are tubular in shape, is seated as centrally as possible on the contact rails 23B. The components 3 each rest with a respective contact face 25, oriented toward the upper face end 5 of the component substrate 1, on two at a time of the contact rails 23, 23A, 23B.

When the components 3 rest on the contact rails 23, 23A, 23B, a magnetic air gap 24, ranging between 1.5 and 5 mm in width, for example, is formed between the contact faces 25 of the components 3 and an upper end face 22 of the at least one magnet 8 disposed in the recess 7. Because of the ferromagnetic contact rails 23A, 23B, the magnetic air gap 24 is reduced to the dimension of the thickness of the contact strip 21, namely to the effective magnetic air gap 24A; depending on the dimensions of the arrangement, it amounts to only a fraction, such as 25 to 75%, of the magnetic air gap 24 that is created in arrangements in which the contact strip 21 and contact rails 23 form a structural element of diamagnetic material. The contact rails 23, 23A, 23B establish the necessary flow of current through each of the components 3 for the electrolytic coating of the components 3. A material that has good electrical conductivity and is diamagnetic, such as aluminum, serves as the material for the contact strip 21.

Each of the components 3, for instance of tubular shape and having a longitudinal bore 26 shown in dashed lines, is encompassed by the side parts 11, 13 of the covering 9 in the direction of a component axis 27, for instance extending parallel to those side parts 11, 13, and protrudes through the through opening 17 of the cap part 15 of the covering 9 in the direction of the respective component axis 27. The covering 9 assures that on the components 3 to be coated, an electroplated layer is deposited substantially only on their face end 29 remote from the contact face 25.

Figure 1:
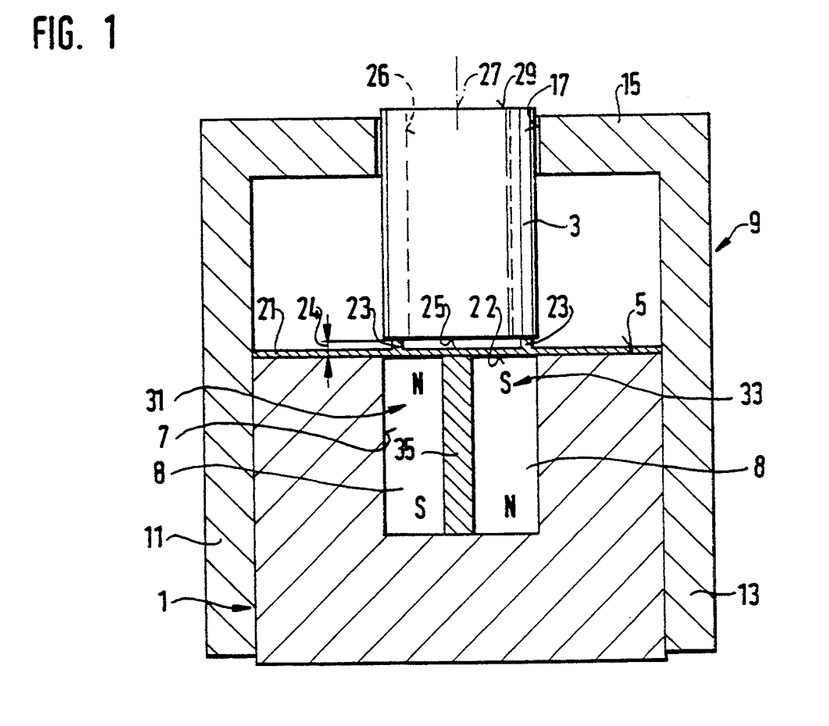
FIG. 1 shows a first exemplary embodiment of a component substrate according to the invention.

In the exemplary embodiment shown in FIG. 1, the at least one recess 7 extending longitudinally of the component substrate 1 is embodied such that it has a rectangular cross section. Dipole magnets 8, two in number, for example, extending longitudinally of the component substrate 1 and by way of example embodied as bar magnets, are disposed in the recess 7 parallel to the component axis 27; each magnet has one pole 31, 33, oriented toward the contact face 25 of the component 3, and the magnet poles 31, 33 have opposite polarity.

If the magnet pole marked N (north) is assigned reference numeral 31, then the magnet pole parked S (south) is assigned reference numeral 33. The two magnets 8 and hence the magnet poles 31, 33 as well are separated from one another by a magnetically neutral zone 35, located between the two magnets 8 and comprising a nonmagnetized magnetic material or a diamagnetic material and preventing a direct magnetic short circuit between the two magnet poles 31 and 33.

The field lines of the magnetic field extend in the component 3, which is to be coated and is held by the component substrate 1, in concentrated form in the region near its contact face 25, from one magnet pole 31 to the other magnet pole 33 of the magnets 8, and do not extend as far as the face end 29 to be electroplated of the component 3, or do so only in the form of a negligible stray flux. The poles of opposite polarity of the magnets 8, assigned to the magnet poles 31, 33, are located in the direction of the component axis 27 at the ends of the magnets 8 remote from the component 3.

Figure 2:
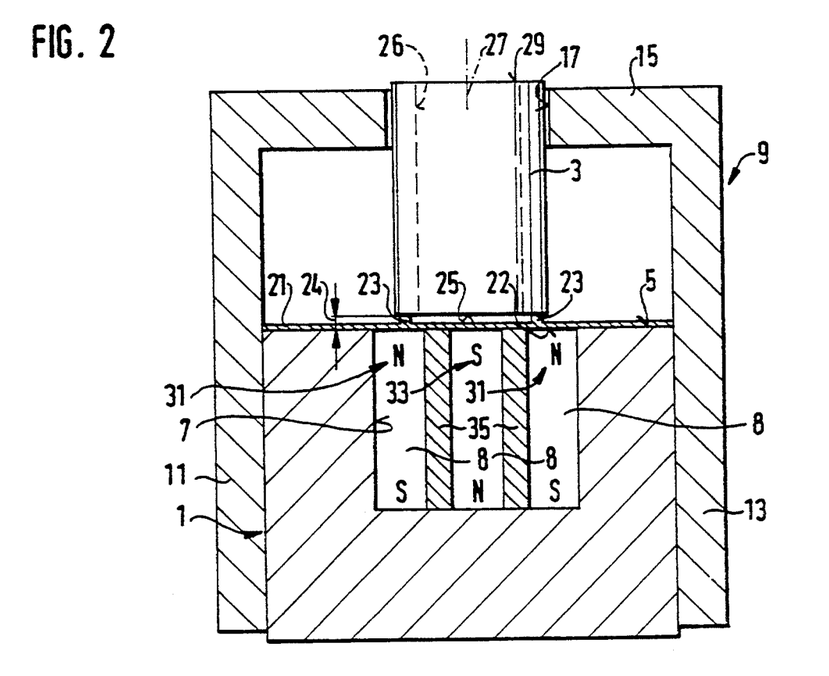
FIG. 2 shows a second exemplary embodiment.

In the exemplary embodiment shown in FIG. 2, three dipole magnets 8, for instance, are disposed in the recess 7 of rectangular cross section of the component substrate 1; they extend longitudinally of the component substrate 1, for example, and serve to hold a plurality of components 3. The magnets 8 are disposed next to one another parallel to the component axis 27 and are each separated from one another by a magnetically neutral zone 35, formed of a nonmagnetized magnetic material or of a diamagnetic material and preventing a direct magnetic short circuit between the two magnet poles 31 and 33. Toward the contact face 25 of the component 3, the three magnets 8 each form one magnet pole 31, 33, and each two adjacent magnet poles 31, 33 are of opposite polarities. The magnetic field lines of the magnetic field generated in the component 3 by the magnet poles 31, 33 extend in concentrated form near the contact face 25 of the component 3, from one magnet pole 31 to the other magnet pole 33, and do not, or to only a negligible extent, extend as far as the region to be coated on the face end 29 of the component 3 remote from the contact face 25. This arrangement of the three magnets 8 effectively prevents loose ferromagnetic particles from being capable of sticking in the region to be coated of the component, and as a result they assure smooth coating of the component 3 on its face end 29.

Figure 3:
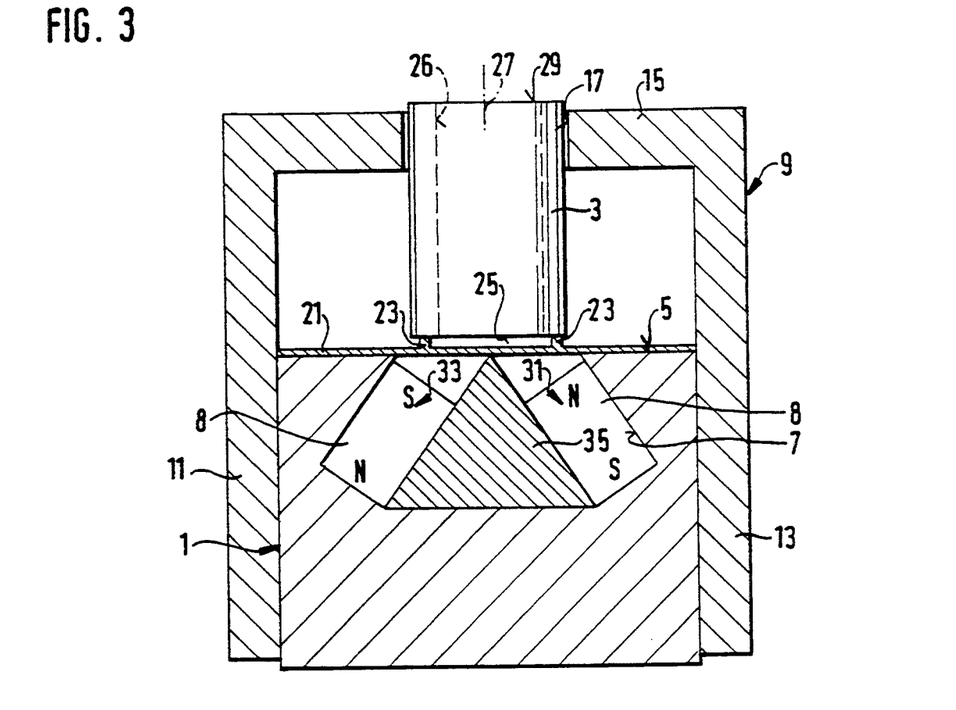
FIG. 3 shows a third exemplary embodiment.

FIG. 3 shows a third exemplary embodiment, in which two dipole magnets 8, embodied as bar magnets, for example, are disposed in the recess 7 of the component substrate 1, inclined outward, away from the component 3, relative to the component axis 27. A neutral zone 35 is provided between the two magnets 8 and prevents a direct magnetic short circuit of the two magnet poles 31 and 33, oriented toward the contact face 25 of the component 3 and of opposite polarities, of the magnets 8. This arrangement of the two magnets 8 again assures that the magnetic field lines extending from one magnet pole 31 to the other, opposite magnet pole 33 extend in concentrated form through the component 3 only in a region near its contact face 25, and not influentially into the region of the face end 29 of the component 3 that is to be coated. This assures that the magnetically held components 3 will be coated without the risk of inclusions of particles.

Figure 4:
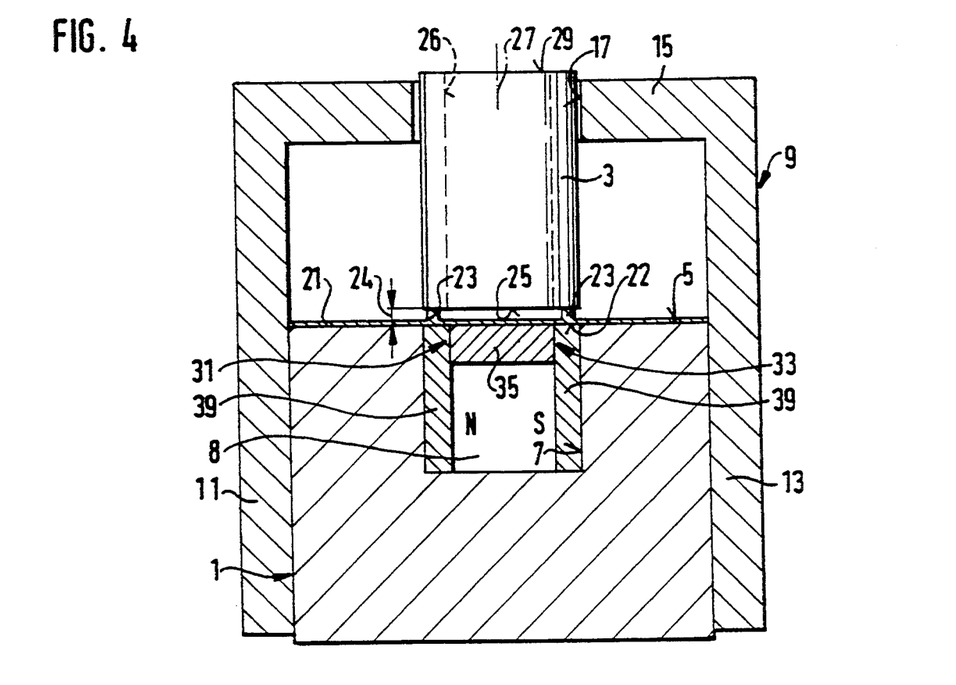
FIG. 4 shows a fourth exemplary embodiment.

In the fourth exemplary embodiment shown in FIG. 4, two pole pieces 39, each forming one magnet pole 31, 33, are disposed in the recess 7 of the component substrate 1, extending in the direction of the axis 27 of the at least component 3 that is to be held. In the direction at right angles to the component axis 27, a dipole magnet 8 is disposed between the two pole pieces 39, remote from the component 3; it magnetically induces the two pole pieces 39 of opposite polarity that form the magnet poles 31 and 33, or in other words rests with the N pole on the left-hand pole piece 39, for example, and with the S pole on the right-hand pole piece 39. A neutral zone 35, extending as far as the upper face end 5 of the component substrate 1, for example, is provided toward the component 3, adjoining the magnets 8 extending at right angles to the component axis 27, and prevents a direct magnetic short circuit between the magnet poles 31 and 33. The neutral zone 35 may be embodied by air or by a diamagnetic material, and how its height in the direction of the component axis 27 is selected makes it possible to vary the magnetic force on the component 3. If the height of the neutral zone 35 in the direction of the component axis 27 is low, a greater magnetic force on the component 3 is produced than if the height were greater. Beginning at the pole piece 39 forming one magnet pole 31, the magnetic field lines extend through the component 3, concentrated in the region near its contact face 25, to the other pole piece 39 forming the other magnet pole 39, and do not extend influentially as far as the region to be coated of the face end 29 of the component 3.

Figure 5:
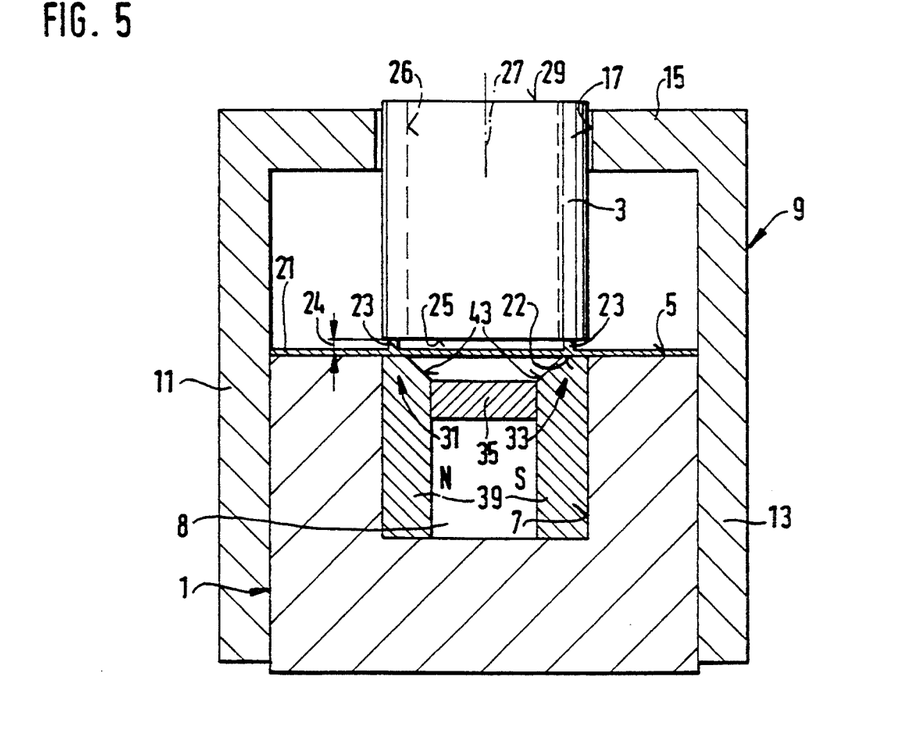
FIG. 5 shows a fifth exemplary embodiment.
Figure 6:
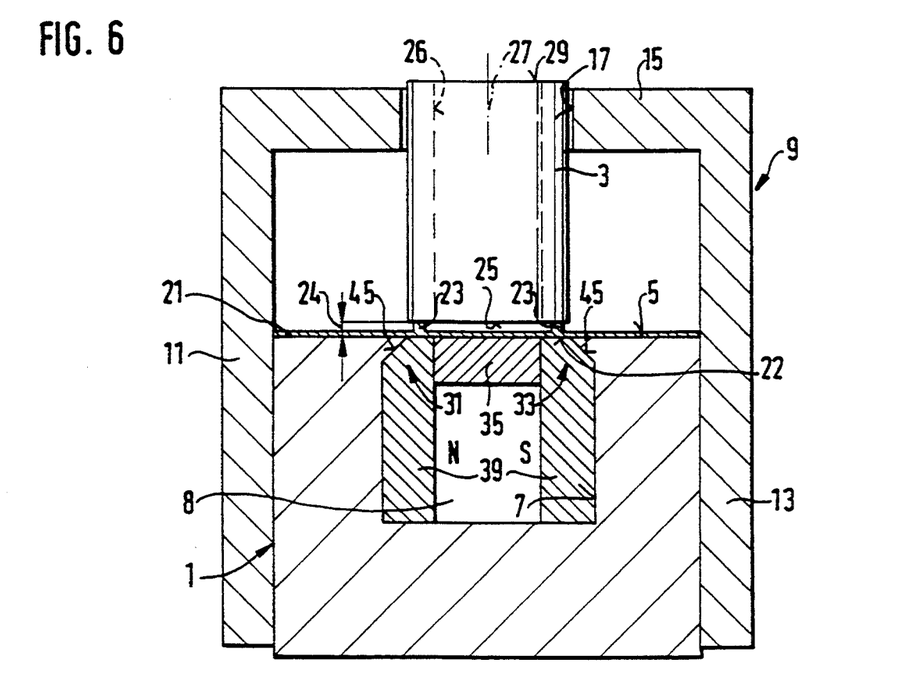
FIG. 6 shows a sixth exemplary embodiment.

The exemplary embodiments shown in FIGS. 5 and 6 are substantially equivalent in structure and function to the fourth exemplary embodiment shown in FIG. 4. In the fifth exemplary embodiment, the pole pieces 3 each have one inner chamfer 43, or in other words a beveled face, oriented inward toward the neutral zone 35 and extending longitudinally of the component substrate 1, on their ends oriented toward the component 3. The neutral zone 35, serving to prevent a direct magnetic short circuit between the magnet poles 31 and 33, extends toward the cap part 15 of the covering 9 only as far as the lower edges of the inner chamfers 43, for example.

In the sixth exemplary embodiment, shown in FIG. 6, the pole pieces 39 each have one outer chamfer 45, that is, a beveled face, extending longitudinally of the component substrate 1 on their ends toward the component 3, but remote from the magnet 8 and the magnetically neutral zone 35. The neutral zone 35 serving to prevent a direct magnetic short circuit between the magnet poles 31 and 33 extends as far as the level of the contact strip 21 resting on the magnet poles 31, 33.

The varied embodiment of the pole pieces 39 enables simple adaptation of the component substrate 1 to the geometry and size of components 3 to be held. The embodiment of the pole pieces 39 with the inner chamfers 43, for instance, as shown in FIG. 5, is especially suitable for holding relatively large, heavy components 3, while the embodiment of the pole pieces 39 having the outer chamfers 45, as shown in FIG. 6, is especially suitable for holding smaller, lighter components 3, because in the component 3, which may for instance be hollow-cylindrical, the contact face 25 should be approximately equal in size to the face of the magnet poles 31, 33 facing the contact face 25, in order to concentrate the course of the magnetic field lines.

Figure 7:
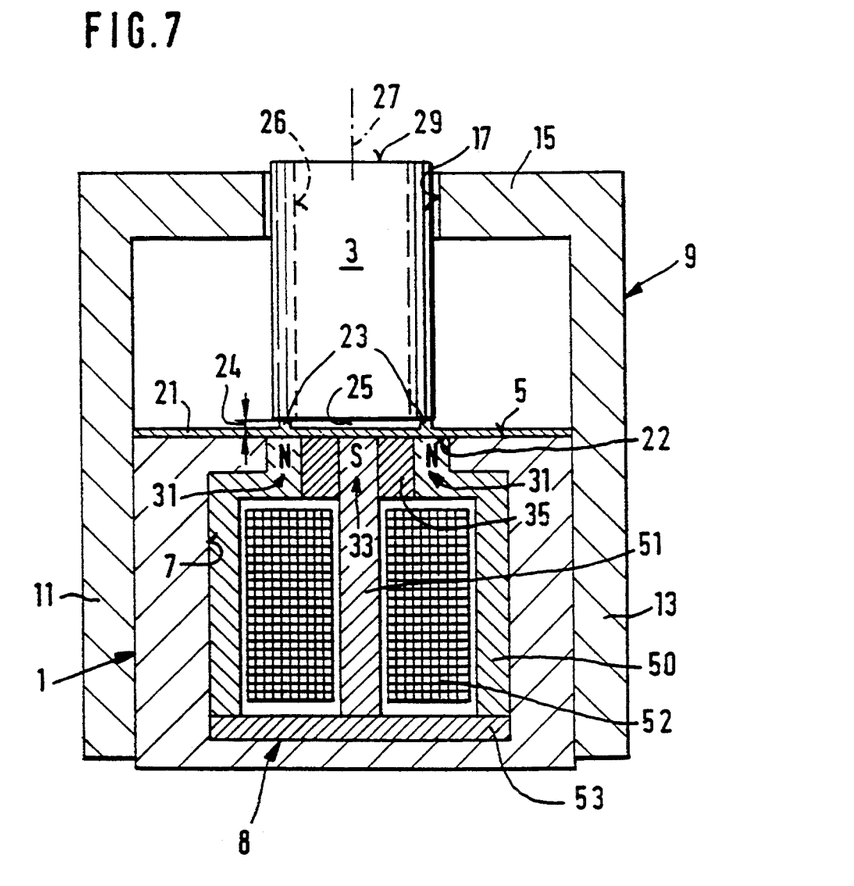
FIG. 7 shows a seventh exemplary embodiment.

FIG. 7 shows an exemplary embodiment in which compared with the exemplary embodiments shown in FIGS. 1–6, elements that remain the same and function the same are provided with the same reference numerals. The exemplary embodiment of FIG. 7 has an arrangement in which the necessary forces of adhesion are generated by means of at least one rotationally symmetrical electromagnet 8. Like the permanent magnet 8 of the preceding embodiments, the electromagnet 8 is located in the recess 7 of the component substrate 1. A pole jacket 50 forms the outer rotationally symmetrical cap of the electromagnet 8. By way of example, the pole jacket 50 is embodied such that it has a smaller diameter in the region of its upper end face 22, oriented toward the component 3, than in the region of a current coil 52. An encompassing magnet pole 31 is formed on the pole jacket 50, toward the upper end face 22; it extends in the region or at least in the vicinity of the contact rails 23, specifically on the side of the contact strip 21 remote from the contact rails 23. The contact rails 23 may also be approximately the same shape, such as circular, as the contact face 25 of the component 3.

Inside the current coil 52, a pole core 51 is formed, extending in the direction of the component axis 27 and having the magnet pole 33. The pole jacket 50 and the pole core 51, along with their magnet poles 31 and 33, extend toward the component 3 as far as the contact strip 21 and away from the component 3 as far as a short-circuit plate 53. The short-circuit plate 53 forms the boundary remote from the component 3 of the electromagnet 8 and is embodied as a circular disk. As already described, the magnet poles 31 and 33 are separated from one another by means of the magnetically neutral zone 35, disposed between the magnetic poles 31 and 33, that prevents a magnetic short circuit; this zone may be embodied of a diamagnetic material, for example.

The exemplary embodiment includes two variant forms for the magnet. The first variant is characterized by the use of a soft magnetic material. Specifically, the pole jacket 50, pole core 51 and short-circuit plate 53 are made from a ferromagnetic material with a low coercive field intensity ($H_c < 1000$ A/m). Power is supplied to the electromagnet 8 during the entire process time of electroplating of the component 3. As long as current is flowing through the current coil 52 of the electromagnet 8, the component 3 is held. Not until the current is switched off does the force of adhesion acting on the part drop or virtually vanish, causing the component 3 to be released. The current through the current coil 52 of the electromagnet 8 can be selected so as to provide for varying the adhesive force and adapting it to the component sizes.

The second variant likewise provides a soft magnetic material for the pole jacket 50 and the short-circuit plate 53 but for the pole core 51, it provides a ferromagnetic material of high coercive field intensity ($H_c > 1$ kA/m), or in other words a permanent magnetic material is used. However, the pole core 51 is not yet magnetized when it is inserted. After the components 3 have been placed on the contact rails 23, the pole core 51 is permanently magnetized via a current pulse. This assures the firm holding of the components 3, without having further currents flow in the electromagnet 8 during the electroplating process. Not until the electroplating has been completed is the pole core 51 demagnetized again, by means of a current pulse in a direction opposed to the first current pulse. The components 3 are now free and can be removed. Using the magnetizable pole core 51 and magnetizing this pole core 51 by means of at least one current pulse supplied to the current coil 52 has the advantage that the power supply need not be maintained over the entire process time.

Figure 8:
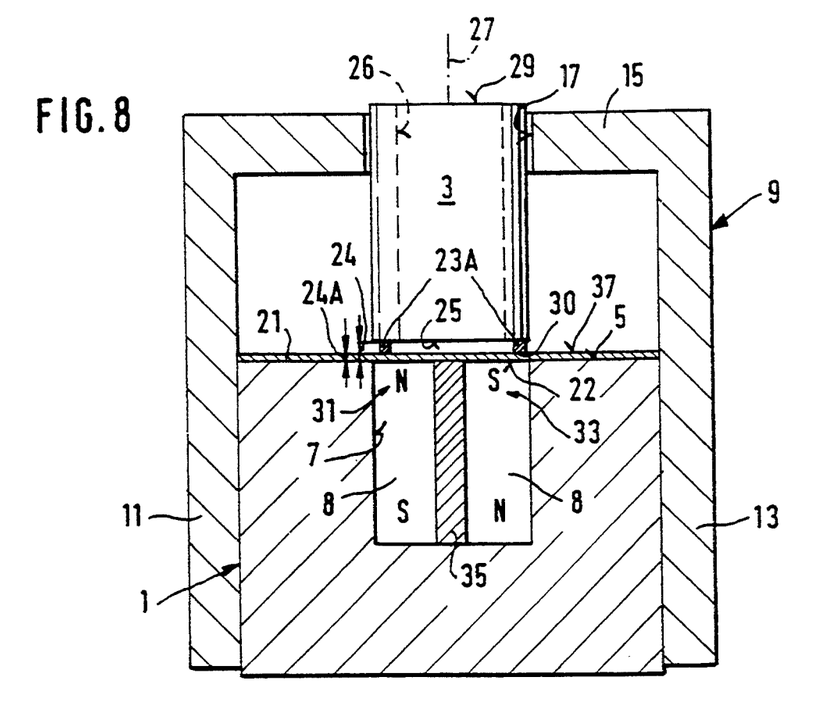
FIG. 8 shows a eighth exemplary embodiment.

The eighth exemplary embodiment shown in FIG. 8 has an arrangement that compared with the first seven exemplary embodiments is modified only in the region of the contact strip 21 with the associated contact rails 23. In the exemplary embodiment of FIG. 8, the contact strip 21 and the contact rails 23A are embodied as independent structural elements. Once again, a material that has good electrical conductivity and is diamagnetic, such as aluminum, is used as the material for the contact strip 21. The contact rails 23A are embodied similarly to those of the previous exemplary embodiments, namely extending longitudinally of the component substrate 1 on the side 37 of the contact strip 21, remote from the upper face end 5 of the component substrate 1. However, a ferromagnetic material is used to produce the contact rails 23A. The contact rails 23A are placed and secured to the side 37 of the contact strip 21 remote from the at least one magnet 8, creating an electrically conductive connection 30. The electrical contact of the contact rails 23A need not be made via the compact strip 21; instead, the contact rails 23A may be connected directly to the current circuit of the electroplating bath, in other words without the interposition of the contact strip 21.

Because of the ferromagnetic contact rails 23A, the magnetic flux is again concentrated on the components 3 to be held only in the vicinity of the contact face 25 facing the magnet poles 31, 33. This is especially advantageous if strong forces of adhesion are to act upon the contact rails 23A, because the components 3 are large. The ferromagnetic contact rails 23A, because of their low magnetic resistance, which is accordingly negligible compared to the contact strip 21, provide a reduction of the magnetic air gap 24 by the height of the contact rails 23A to produce the effective magnetic air gap 24A.

The effective magnetic air gap 24A thus now extends only between the upper end face 22 of the at least one magnet 8 disposed in the recess 7 and the side 37 of the contact strip 21 remote from the at least one magnet 8. The decrease of the magnetic air gap 24 to the effective magnetic air gap 24A results in an increased force of adhesion at the contact rails 23A.

The field lines of the magnetic field generated by the at least two magnet poles 31, 33 again extend with a concentration, in the component 3 to be held, only in the vicinity of the contact face 25 of the component 3 facing the magnet poles 31, 33, and not or only to a limited extent at the face end 29, which is to be coated, of the component 3. The arrangements of the magnets 8 in the recesses 7 of the first through seventh exemplary embodiments can also be adopted completely for the eighth exemplary embodiment, which is distinguished primarily by the independent embodiment of the contact strip 21 and contact rails 23A, the former of diamagnetic material and the latter of a ferromagnetic material.

Figure 9:
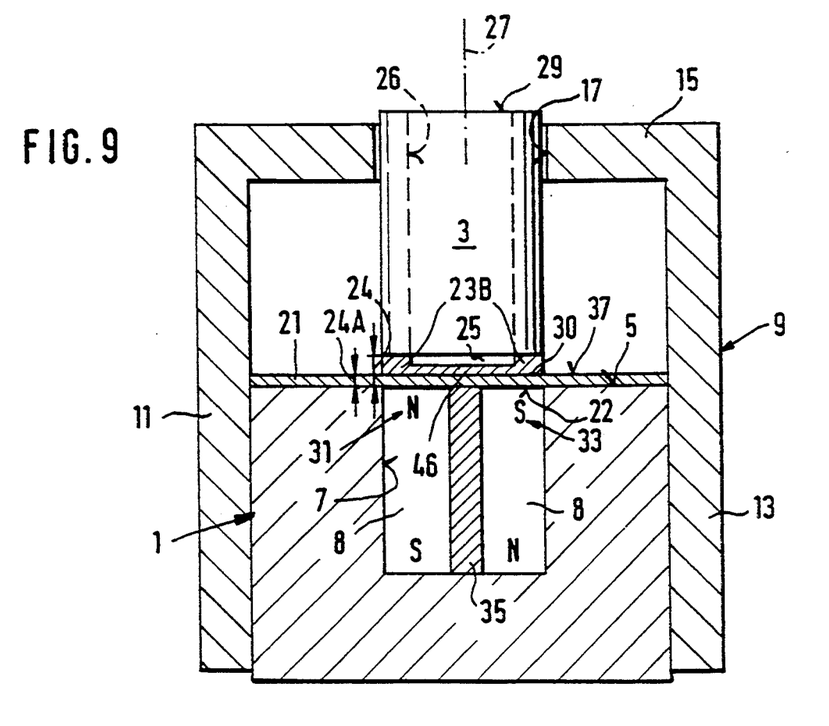
FIG. 9 shows a ninth exemplary embodiment.

A ninth exemplary embodiment, which is shown in FIG. 9, has an independent system comprising two contact rails 23B, for instance, and the connecting web 46, mounted and secured on the side 37 of the contact strip 21 remote from the at least one magnet 8. The contact rails 23B and the connecting web 46 again extend longitudinally of the component substrate 1 on the side 37 of the contact strip 21. The electrical contacting of the system comprising the contact rails 23B and connecting web 46 may be effected via the contact strip 21 or via a direct connection with the current circuit of the electroplating bath. The system comprising the contact rails 23B and the connecting web 46 is embodied in one piece and fabricated from a ferromagnetic material. The connecting web 46 that precisely sets the distance between the two contact rails 23B must not exceed a maximum thickness, as needed, so that the loss in magnetic flux across the magnetic short circuit caused by the connecting web 46 will be as small as possible.

The magnetic short circuit caused by the connecting web 46 tends toward a minimum if an alloy of low saturation induction, such as a nickel-iron alloy, is used for the contact rail system comprising the contact rails 23B and the connecting web 46. Ideally, the proportion of nickel should be approximately 70 to 80%. This nickel-iron alloy has a low saturation induction B of approximately 0.7 Tesla. Pure iron has a saturation induction B of approximately 2 Tesla, which is thus approximately three times higher than that of this nickel-iron alloy. Using such an alloy for the contact rails 23B and the connecting web 46 assures that only insignificantly little magnetic flux is lost across the connecting web 46 acting as a magnetic short circuit. The magnetic short circuit is also reduced by lowering the height of the connecting web 46 in the direction of the component axis 27. The height of the connecting web 46 is limited by a minimum amount required for production purposes.

This arrangement again assures that the magnetic field lines, extending from one magnetic pole 31 to the other, opposite magnetic pole 33 through the component 3 are concentrated only in a region near its contact face 25 and remain without influence in the region of the face end 29, to be coated, of the component 3. Because of the ferromagnetic material for the contact rails 23B and the connecting web 46, the effective magnetic air gap 24A is smaller than the magnetic air gap 24 that in principle results between the upper face end 22 of the at least one magnet 8 and the contact face 25 of the component 3. A combination of the arrangements of magnets 8 in the recesses 7 of the component substrate 1 described in the first seven exemplary embodiments with the embodiment of the one-piece ferromagnetic contact rail system comprising the contact rails 23B and connecting web 46 of the ninth exemplary embodiment can be made at any time.

The dimensioning of the at least one magnet 8 is done taking into account the size and weight of the component or components 3 to be held. To keep the magnetic stray flux as low as possible, the magnetic force of the at least one magnet should be selected as not overly high.

Figure 10:
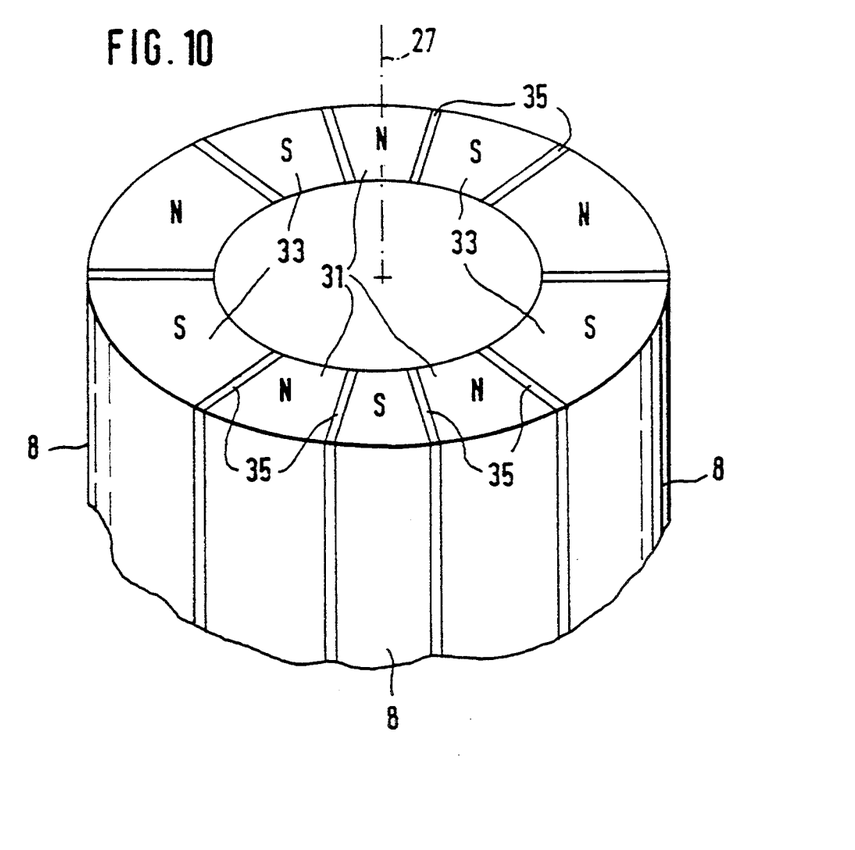
FIGS. 10 and 11 each show a magnet arrangement according to the invention for a component substrate.

FIG. 10 shows an arrangement of magnets 8 that extends approximately in the direction of the component axis 27; a plurality of magnet poles 31, 33 are disposed in a circle next to one another. The end faces of two adjacent magnet poles 31, 33, with a neutral zone 35 between each of them, each have opposite polarities.

Figure 11:
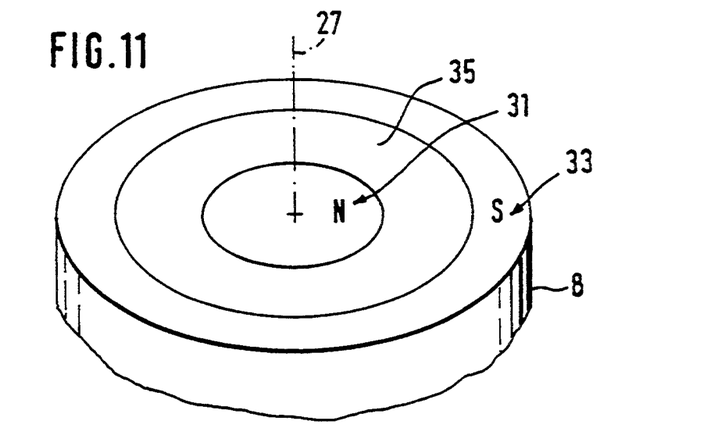

In FIG. 11, by way of example, a magnet 8 extending approximately in the direction of a component axis 27 is shown that toward the contact face 25 of at least one component 3 to be held has two magnet poles 31, 33 of opposite polarity. The magnet pole 33 marked S is annular, for instance, and radially surrounds the magnet pole 31 marked N in a spaced-apart manner. An annular neutral zone 35 directly surrounding the magnet pole 31, for instance, is disposed radially between the two magnet poles 31, 33.

The component substrate 1 for carrying out the method according to the invention for holding the ferromagnetic components 3 has at least two magnet poles 31, 33 of opposite polarity, so that the magnetic field lines from one magnet pole 31 to the other magnet pole 33 extend through the components 3 substantially only in the region of the contact faces 25. This prevents ferromagnetic particles from being deposited on the ends of the components 3 remote from the contact faces.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A component substrate for holding at least one component, said component substrate (1) is made of a non-ferromagnetic material and said at least one component (3) is embodied of a ferromagnetic material, said at least one components (3) has a contact face (25) supported on the component substrate (1) by use of at least one magnet, said at least one magnet (8) is arranged in said component substrate (1) and has at least two magnet poles (31, 33) facing toward the contact face (25) of the at least one component (3) and that produce magnetic field lines, a contact strip (21) made of a diamagnetic material is mounted on an upper face end (5) of said component substrate (1) and said contact strip (21) is connected with an electric circuit and at least one separate contact rail (23A) made of a ferromagnetic material is arranged on said contact strip (21) on a side opposite from said at least one magnet (8), and the contact face (25) of the at least one component (3) rests on the at least one contact rail (23A) and is separated from the magnet poles (31, 33) by the at least one contact rail (23A) and the contact strip (21), each adjacent magnet pole (31, 33) having an opposite polarity, and the magnetic field lines extend between the magnet poles (31, 33) through the component (3), concentrated in a region near the contact face (25).

2. A component substrate for holding at least one component, said component substrate (1) is made of a non-ferromagnetic material and said at least one component (3) is embodied of a ferromagnetic material, and said at least one component (3) has a contact face (25) supported on the component substrate (1) by use of at least one magnet, said at least one magnet (8) is arranged in said component substrate (1) and has at least two magnet poles (31, 33) facing toward the contact face (25) of the at least one component (3) and that produce magnetic field lines, a contact strip (21) made as an independent diamagnetic material structural element is mounted on an upper face end (5) of said component substrate (1) and said contact strip (21) is connected with an electric circuit, and a pair of contact rails (23B) made of a ferromagnetic material is arranged on said contact strip (21) on a side opposite from said at least one magnet (8), and said contact rails (23B) are joined to one another via a connecting web (46) made of ferromagnetic material, said connecting web (46) together with the contact rails (23B) form a single ferromagnetic material part, and the contact face (25) of the at least one component (3) rests on the pair of contact rails (23B) and is separated from the magnet poles (31, 33) by the pair of contact rail (23B) and the contact strip (21), each adjacent magnet pole (31, 33) having an opposite polarity, and the magnetic field lines extend between the magnet poles through the component (3) concentrated in a region near the contact face (25).

3. A component substrate having an upper face and a lower face and embodied of a non-ferromagnetic material for holding at least one component (3) embodied of a ferromagnetic material and having a contact face (25) for electroplating one end (29) of said component (3), said component substrate (1) is provided with a longitudinal recess (7), a longitudinally extending contact strip (21) of electrically conductive material is disposed on said upper face (5) of said component substrate (1) perpendicular to said at least one magnet in said longitudinal recess, and said contact strip (21) is connected with an electric circuit said at least one magnet has at least two magnet poles (31, 33) that produce magnetic field lines facing said contact strip, said at least one magnet is positioned in said longitudinal recess and each adjacent magnetic pole has an opposite polarity so that said magnet field lines pass through said contact strip, said contact strip is perpendicular to said at least one magnet and at least one contact rail (23, 23A, 23B) is arranged on said contact strip perpendicular thereto on a side opposite from said at least one magnet and within the magnetic field lines, means for holding said component (3) with said contact face (25) seated on said at least one contact rail in electrical contact therewith and in the magnetic field lines produced by said at least two magnet poles, and means for connecting said contact strip with a cathode of an electroplating bath.

4. A component substrate as defined by claim 3, in which the component substrate (1) has precisely two magnet poles (31, 33) of opposite polarity facing toward the contact face (25) of the at least one component (3).

5. A component substrate as defined by claim 3, in which the component substrate (1) has at least two magnets, forming the magnet poles (31, 33) and embodied as bar magnets facing toward the contact face (25) of the at least one component (3) said at least two magnets (8) are disposed inclined obliquely relative to one another.

6. A component substrate as defined by claim 3, in which the component substrate (1) has precisely three magnet poles (31, 33) facing toward the contact face (25) of the at least one component (3), and that each two adjacent magnet poles (31, 33) have opposite polarity.

7. A component substrate as defined by claim 3, in which the component substrate (1) has precisely two magnet poles (31, 33) facing toward the contact face (25) of the at least one component (3), and that to form the two magnet poles (31, 33), two pole pieces (39) are used, between which a dipole magnet (8) is disposed, remote from the component (3) is disposed.

8. A component substrate as defined by claim 3, in which the magnet poles (31, 33) oriented toward the contact face (25) of the at least one component (3) are arranged circular shaped.

9. A component substrate as defined by claim 3, in which the magnet poles (31, 33) oriented toward the contact face (25) of the at least one component (3) are arranged concentrically with respect to one another, and that at least one of the two magnet poles (31, 33) is embodied annularly.

10. A component substrate as defined by claim 3, in which a magnetic air gap (24) is provided between the contact face (25) of each component (3) and the at least two magnet poles (31, 33) of the at least one magnet (8).

11. A component substrate as defined by claim 3, in which the at least one magnet is embodied as a permanent magnet.

12. A component substrate as defined by claim 3, in which the at least one magnet (8) is embodied as an electromagnet (50, 51, 52, 53).

13. A component substrate as defined by claim 12, in which the electromagnet (50, 51, 52, 53) has a pole jacket (50) and a pole core (51) of soft magnetic material.

14. A component substrate as defined by claim 12, in which the electromagnet (50, 51, 52, 53) has a pole jacket (50) of soft magnetic material, and the pole core (51) is fabricated from a permanent magnet material.

15. A component substrate as defined by claim 3, in which a neutral zone (35) is provided between two adjacent magnet poles (31, 33).

16. A component substrate as defined by claim 3, in which the component substrate (1), has a contact strip (21) with at least one contact rail (23, 23A, 23B) mounted on an upper face end (5), and the contact face (25) of the at least one component (3) rests on the at least one contact rail (23, 23A, 23B) and is separated from the magnet poles (31, 33) by the at least one contact rail (23, 23A, 23B) and the contact strip (21).

17. A component substrate as defined by claim 16, in which the contact strip (21) and the at least one contact rail (23) are embodied in one piece as a structural element and are made from diamagnetic material.

18. A method for holding at least one component (3) made of ferromagnetic material with a contact face (25) of said at least one component supported on a component substrate (1) during electroplating for coating at least one end of the at least one component, which comprises positioning at least one magnet having at least two adjacent magnet poles (31, 33) of differing polarity in a recess in the component substrate (1), positioning the component (3) with said contact face (25) on the component substrate (1) in such a manner that the magnet field lines between said adjacent magnet poles (31, 33) are concentrated in a region near the contact face (25) and extend through the component (3), arranging at least one contact strip (21) with at least one contact rail (23, 23A, 23B) between the magnet poles (31, 33) and the component (3), resting the component (3) on the contact rail (23, 23A, 23B), and connecting the contact rail (23, 23A, 23B) to an electrical current, so that current also flows through the component (3).

19. A method as defined by claim 18, in which the component substrate (1) has precisely two magnet poles (31, 33) of opposite polarity facing toward the contact face (25) of the at least one component (3).

20. A method as defined by claim 18, in which the component substrate (1) has at least two magnets, forming the magnet poles (31, 33) and embodied as bar magnets facing toward the contact face (25) of the at least one component (3) and said at least two magnets (8) are disposed inclined obliquely relative to one another.

21. A method as defined by claim 18, in which the component substrate (1) facing toward the contact face (25) of the at least one component (3) has precisely three magnet poles (31, 33) and that each two adjacent magnet poles (31, 33) have opposite polarity.

22. A method as defined by claim 18, in which the component substrate (1) facing toward the contact face (25) of the at least one component (3) has precisely two magnet poles (31, 33), and that to form the two magnet poles (31, 33), two pole pieces (39) are used, between which a dipole magnet (8) is disposed, remote from the component (3).

23. A method as defined by claim 18, in which comprises the magnet poles (31, 33) oriented toward the contact face (25) of the at least one component (3) are arranged circular shaped.

24. A method as defined by claim 18, in which comprises, arranging the magnet poles (31, 33) oriented toward the contact face (25) of the at least one component (3) concentrically with respect to one another, and that at least one of the two magnet poles (31, 33) is embodied annularly.

25. A method as defined by claim 18, which comprises providing a magnetic air gap (24) between the contact face (25) of each component (3) and the at least two magnet poles (31, 33).

26. A method as defined by claim 18, which comprises providing a neutral zone (35) between two adjacent magnet poles (31, 33).

27. A method as defined by claim 18, which comprises forming the magnet (8) as an electromagnet (50, 51, 52, 53), having a current coil (52), a pole jacket (50), and a pole core (51), with the pole jacket (50) and the pole core (51) made of soft magnetic material and providing a power supply to the current coil (52) over an entire processing time for the electroplating, in order to hold each of the components (3) continuously.

28. A method as defined by claim 18, which comprises forming the magnet (8) as an electromagnet (50, 51, 52, 53), having a current coil (52), a pole jacket (50), and a pole core (51), forming the pole jacket (50) of a soft magnetic material and the pole core (51) of a permanent magnetic material, and permanently magnetizing the pole core (51) for holding the at least one component (3), through said permanent magnet material is by passing a first current pulse via the current coil (52), and attaining a demagnetization of the pole core (51) for removal of the at least one component (3) by passing a current pulse via the current coil (52) in a direction opposite the first current pulse.

* * * * *